William G. Schuirmann
INVENTOR

BY
Charles L. Reynolds
ATTORNEY

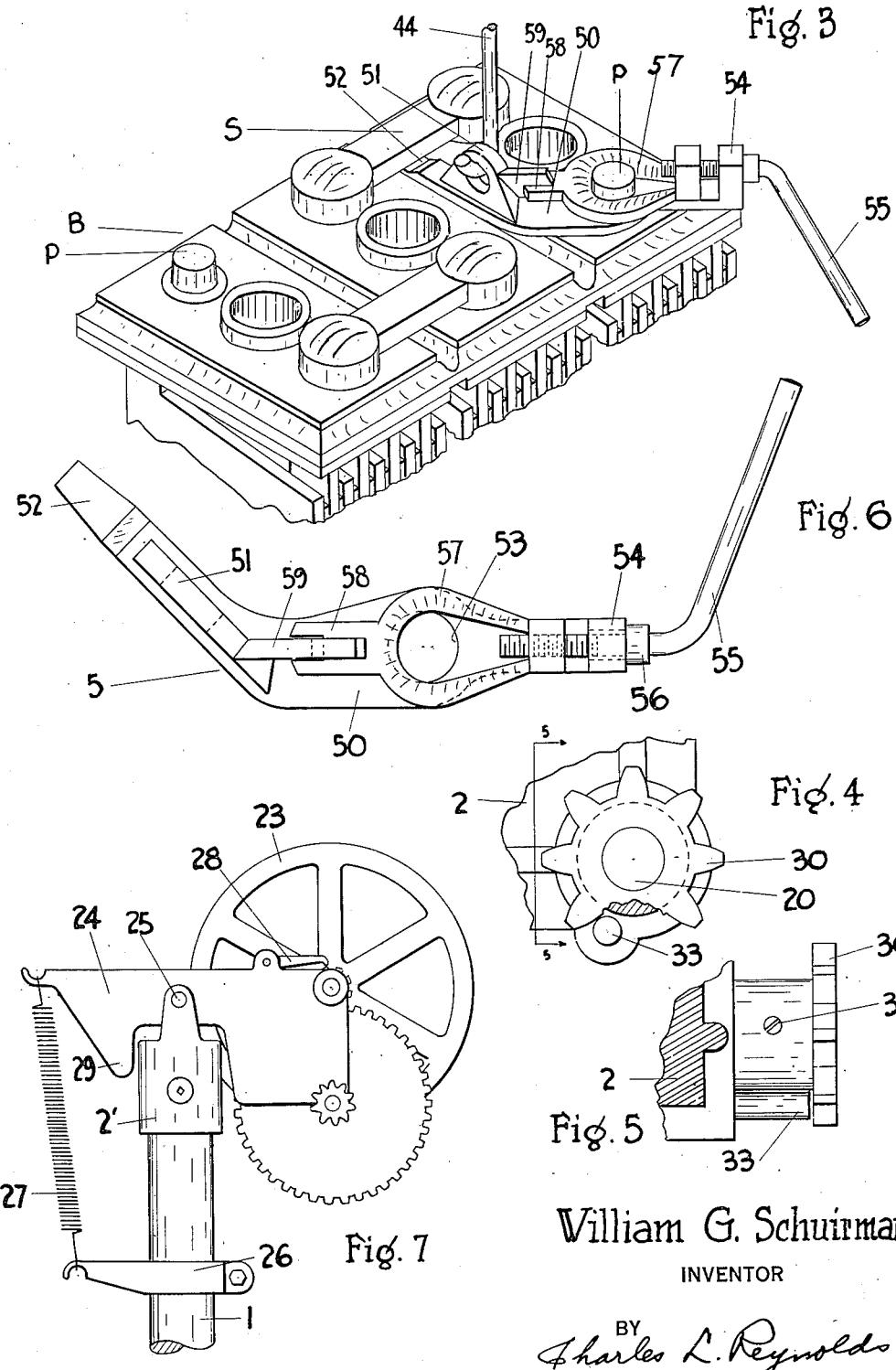

Patented July 7, 1936

2,046,490

UNITED STATES PATENT OFFICE 2,046,490

BATTERY CELL EXTRACTOR

William G. Schuirmann, Seattle, Wash.

Application April 15, 1935, Serial No. 16,388

16 Claims. (Cl. 29—84)

My invention relates to battery plate extractors, and more particularly to a machine which will remove from a storage battery case all the plates of the several battery cells in their completely assembled form.

Most storage batteries are of the multicell, usually three-cell, type, and hence I have illustrated my invention as used in taking apart batteries of this type, although it is readily adapted to batteries having any number of cells. The usual method of removing the plates of battery cells from battery cases is to drill down through the straps interconnecting the plate structures of the cells at points directly above the cell posts. After thus separating the straps from the posts the straps may be lifted off and the plate structures of the cells pulled from the battery case one by one.

It is an object of my invention to provide a device which will lift the entire battery plate structure, consisting of the plates of the several units of a multicell battery, all operatively interconnected, from the battery case. The inconvenience of removing and replacing the cell interconnecting straps is thereby eliminated.

In the old method of removing the plate structures of storage battery cells from a battery case it was necessary to dig out, or at least to soften by heating, all the sealing compound around the top of the cell covers before the plate structure could be withdrawn. A further object, therefore, is to provide a device which will exert a force to pull the plate structure, even though the sealing compound has not been removed or heated.

It is a further object to provide means, if desired, for exerting a steady pull upon the plate structure over an extended period of time, without requiring the attendance of an operator, so that the loosening of the sealing compound and the first stage of the pulling may be accomplished gradually and automatically after the machine has been set in operation.

Still another object of my invention is to provide a machine for accomplishing my purpose which is of rugged construction and yet, having few parts, is comparatively inexpensive to manufacture.

Other objects, and more particularly those inherent in the constructional features of my device, will be apparent from a study of the following description.

My invention comprises the novel machine, and parts thereof, shown in the drawings, and described in the specification, including the novel structure defined in the appended claims.

A preferred form of my device is shown in the accompanying drawings as illustrative of one mechanism for accomplishing my purpose, although various other structures might be employed.

Figure 3 is a perspective view of the top of a storage battery, showing the application of my device thereto.

Figure 4 is a fragmentary side elevation view, and Figure 5 is a fragmentary front elevation view, taken on line 5—5 of Figure 4, showing a detail of my machine.

Figure 6 is a plan view of a clamp constituting one part of my device.

Figure 7 is a side elevation view of a modified form of head for my device.

Figures 1, 2:
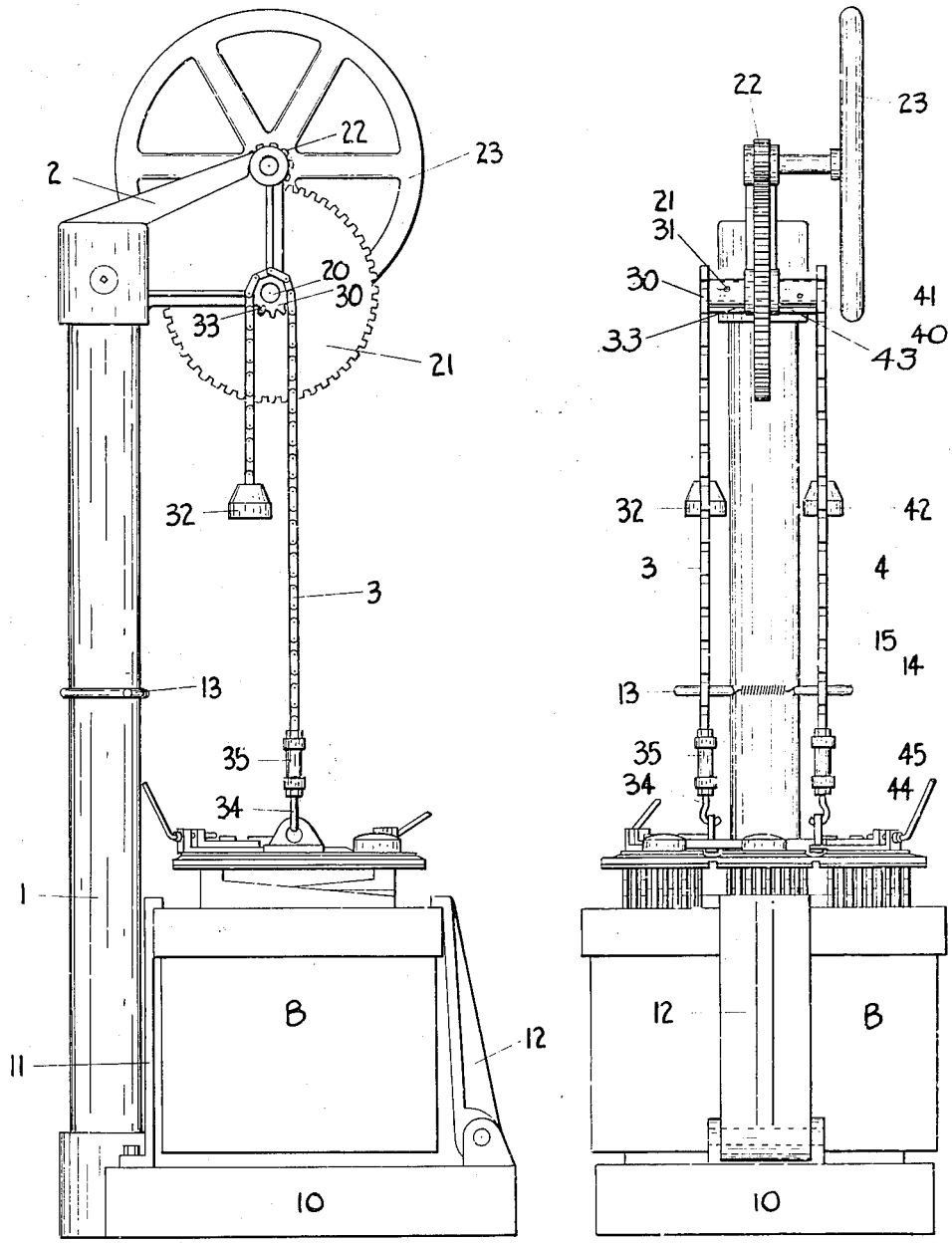
Figure 1 is a side elevation view of my machine.
Figure 2 is a front elevation view.

My machine is preferably of the type employing a standard mounted on a base. Upon the top of the standard is secured a head from which depends and reacts pulling mechanism for engaging the plate structure of a storage battery supported on the base. In this specification the term "multicell battery plate assembly" will be used to denote the plate structure of all the plural cells of a complete battery, interconnected by conventional straps to form a unit which may be received within a battery case. The term "plate structure" refers to the positive and negative plate groups of one or more cells forming part or all of a battery.

More particularly the standard may include a post 1 mounted upon the base 10 and carrying a head 2. A flanged member 11 cooperates with a pivoted flanged member 12 for engaging over upper opposite edges of the case of a battery B. From the head 2 depends a tension member or members, such as chains 3 and 4 running over sprockets 30 and 40, respectively, which are secured by pins 31 and 41 upon opposite ends of a spindle 20 journaled in the head 2. To the center of the shaft 20 is secured a gear 21 rotated by a hand wheel 23 which turns the gear 22 meshing with gear 21.

From the rear ends of chains 3 and 4 are hung weights 32 and 42, respectively, to keep the chains straight, and pins 33 and 43 secured in the head 2 engage the chains as the weights move downward to free the chains from their sprockets. Thus the weights and pins cooperate to prevent the loose ends of the chains from clinging to the sprockets 30 and 40 and interfering with the tensioned portion of the chains when the pulling operation is in progress.

The lower ends of the chains 3 and 4 support hooks 34 and 44, respectively, which are insulated from the chains by insulators 35 and 45. The battery cannot be short-circuited, therefore, through the chains and shaft 20. Each hook 34 and 44 engages a clamp 5, best seen in Figures 3 and 6. This type of clamp, which I have found to be most suitable for engaging the multicell plate assembly of a storage battery, includes a base plate 50 integral with which is a lug 51 provided with a hole for insertion therein of a hook member, such as 34 or 44. This base plate has two main parts lying in a common plane and meeting at an angle, the part carrying the lug 51 terminating in a thinner spoon-shaped nose 52 for engagement under a strap S of a multicell battery plate assembly.

The other portion of the base plate 50 has a hole 53 therein to fit over a post P of the storage battery. Through a lug 54 at the end of this portion of the plate 50 extends a threaded rod 55 bent to form a handle, and provided with a stop collar or ridge 56 which engages the lug 54 to limit inward movement of the rod 55. The threaded portion of this rod screws into a lug on the sliding plate 57 superposed upon the plate 50, and also apertured to embrace the post P. This plate is guided for movement lengthwise of the plate 50 by interlocking slotted members 58 and 59 formed one on the plate 50 and the other on the overlying plate 57. The edge of the aperture in plate 57 tapers down to a sharp edge, so that it may dig into the lead post P for clamping engagement therewith.

To extract the plate structure from a storage battery such battery is first placed on the base 10 with its rear edge beneath the flange of plate 11. The pivoted plate 12 is next swung up against the front side of the battery, as shown best in Figure 1. While the battery is being thus placed in position, the chains 3 and 4 may be hooked behind the laterally projecting arms 13 and 14 of a U-shaped rod held upon the post 1 by a spring 15, for adjustment up or down the post. The next step is, leaving the straps S in place upon the battery, to apply clamps 5 to the multicell battery plate assembly by inserting the nose 52 of each beneath a strap S and lowering the plates 50 and 57 over the posts P, so that the latter project upward therethrough. Turning the handle formed by the rod 55 will draw the lug of plate 57 towards the lug 54. This operation on each clamp pinches its post P between one edge of the aperture 53 and the opposite sharpened edge of the aperture in plate 57. Since the nose 52 cannot escape from beneath its strap, the clamp exerts a secure grip upon the multicell battery plate assembly superstructure.

With the clamps 5 in place, the chains 3 and 4 are lowered, and their respective hooks 34 and 44 are engaged one with each clamp 5. It will be noted that the insulators 35 and 45 prevent shorting of the battery through the standard.

The machine is now ready to pull the plate structure from the case. Upon turning the hand wheel 23 the first movement effected is to lift the entire battery upward until the edges of the case engage the flanges of the two members 11 and 12, as shown in Figures 1 and 2. It will be noted that a space is left between the battery bottom and the base 10. The members 11 and 12 are purposely made longer than the height of any battery, so that batteries of various heights may be accommodated, without requiring adjustment in the length of plates 11 and 12. Continued rotation of the wheel 23 breaks loose the sealing compound from the walls of the battery case, and the entire plate structure engaged is raised bodily, as shown in Figures 1 and 2. The force which can be exerted through the reduction gears 21, 22, makes it unnecessary to remove any of the sealing compound from the top of the battery.

Because of the considerable force required to break loose the sealing compound between the cell covers and the walls of the battery case, it may be preferable to extend this portion of the operation over a longer time. A modified device to accomplish this end without requiring the attendance of an operator is shown in Figure 7. In this form a cap 2' is bifurcated at its upper end to support a rocker arm 24 upon a pivot 25 received in the cap 2'. Beneath the cap a clamp 26 is secured to the post 1, and a spring 27 interconnects hooks on the rocker arm 24 and the clamp 26.

After the battery has been lifted into engagement with the flanges of members 11 and 12, and strain is taken on the chains 3 and 4, the front end of the rocker arm 24 is pulled downward, and the rear end, moving upward, tensions the spring 27. A pawl 28 may then be engaged with the gear 22 to interdict movement of the gears 21 and 22. The tension in the spring 27, acting upon one end of the rocker arm, now opposes the resistance of the sealing compound sticking to the walls of the battery case. A steady pull is thus exerted until the sealing compound gradually breaks loose, whereupon the plate structure moves slightly from its encased position to project above the case. Excessive upward movement of the plate structure upon breaking loose is prevented by engagement of the projection 29 formed on the rocker arm 24 with the cap 2'. When the battery seal has been broken the hand wheel may again be turned to complete the operation of withdrawing the plate structure from the case.

The advantages of a machine of this type will be obvious, since it is unnecessary in the operation explained either to remove the straps S of the multicell battery plate assembly interconnecting the plate structures of the several cells, or to soften or scoop out the sealing compound before the plate structure is pulled, thus saving considerable time and effort.

What I claim as my invention is:

1. An extractor for withdrawing plate structure from a battery case, comprising a base to support thereon a battery, a standard supported from said base, means spaced above the upper edge of the battery case and engageable therewith upon upward movement of the battery case for limiting upward movement thereof, means depending from said standard to engage the plate structure, and means reacting from said first means to raise said depending means for lifting the plate structure from the battery case.

2. An extractor for withdrawing plate structure from a battery case, comprising a base to support thereon a battery, a standard supported from said base, flanged holding members of fixed length mounted on said base and projecting upward therefrom to a height in excess of the height of the battery case, for engagement of said flanges over the upper edge of the battery case, means for engagement with the plate structure, a tension member secured to said means, a guide for said tension member carried by said standard, and means reacting from said holding members to tension said tension member for withdrawing the plate structure from the case.

3. An extractor for withdrawing plate structure from a storage battery case, comprising a base to support thereon a battery, a standard supported eccentrically upon said base, a cantilever head secured on said standard to overhang a battery on said base, a tension member depending from said overhanging head, means secured to the plate structure and engageable by said tension member, and means reacting from said head to tension said member.

4. An extractor for withdrawing a multicell battery plate assembly interconnected by straps from a battery case, comprising means engaging the case, means engaging both the battery terminals and straps of the multicell battery plate assembly, and means to force apart said case-engaging means and said multicell battery plate assembly engaging means, to withdraw the multicell battery plate assembly as a single unit from the case.

5. An extractor for withdrawing a multicell battery plate assembly, as a unit, from its battery case, comprising holding means engaging the case, two means, each engaging the terminal post and the strap which joins the plate structure of the end cell, at the respective ends of the battery, and means to force apart the holding means and the two engaging means.

6. An extractor for withdrawing a multicell battery plate assembly interconnected by straps from a battery case, comprising a standard, hold down means engaging opposite upper edges of the battery case to limit upward movement thereof, a head mounted on said standard, means engaging the multicell battery plate assembly as a unit, only two tension members depending from said head and engaging said assembly engaging means, one near one battery end and the other near the opposite battery end, and means operable to tension said tension members.

7. A clamp for application to a storage battery comprising a plate having an end insertable beneath a battery strap, means on said plate spaced from said insertable end for gripping a battery post, and said plate being engageable, between its insertable end and said means, by pulling mechanism.

8. A clamp for application to a storage battery, comprising a plate having a nose for insertion beneath a battery strap, means spaced therefrom for gripping a battery post, including a superposed, apertured plate movable relatively to said first plate, and an apertured lug upstanding from said first plate, and interposed between said nose and said means for engagement by pulling mechanism.

9. A clamp for application to a storage battery comprising a plate having a nose for insertion beneath a battery strap, and an aperture spaced therefrom, an apertured lug upstanding from said plate between said nose and said aperture for engagement by pulling mechanism, a second apertured plate superposed upon said first plate to place their respective apertures in registry for encircling a battery post, and means operable to move said second plate with respect to said first plate to pinch said post therebetween.

10. A clamp for application to a storage battery comprising an apertured plate to encircle a battery post, a second apertured plate superposed upon said first plate and having an aperture therein substantially in registry with the aperture in said first plate, through which such post projects, and means to effect relative lateral movement of said plates to pinch the post therebetween.

11. A clamp for application to a storage battery comprising two apertured plates superposed to place their respective apertures in registry for encircling a battery post, means cooperating between said two plates to guide the same for relative lateral movement, and means to move one plate with respect to the other to pinch the post therebetween.

12. In a battery cell extractor, a standard, a sprocket carried thereby, a chain carried by said sprocket, a pin carried by said standard adjacent to the face of said sprocket, and disposed parallel to the sprocket's axis and inwardly of the sprocket's periphery to engage the margin of said chain to free it from said sprocket upon rotation thereof, and means connected to said chain and engageable with a storage battery plate structure.

13. An extractor for withdrawing a storage battery plate structure from a battery case comprising a standard, holding means connected thereto engaging the case, means engaging the plate structure, a tension member connected to said second means, means including a spring reacting from said standard to exert a sustained pull on said tension member for initiating movement of the plate structure from the case, and means automatically relieving the tension in said tension member initially effected by said spring upon slight movement of the plate structure outward from its encased position.

14. An extractor for withdrawing a storage battery plate structure from the case, comprising a standard, means thereon engaging opposite upper edges of the case, means gripping the plate structure, a tension member engaging said gripping means, a rocker arm pivotally mounted on said standard, a spring tending to depress one end of said arm, and means on the other end of said arm gripping said tension member to tension the same.

15. A device for application to the plate structure of a storage battery, comprising means to engage a projecting member of the plate structure, means to engage a different projecting member of the plate structure spaced from the first mentioned projecting member, and a member rigidly interconnecting said two means and engageable by pulling mechanism to move said two means and the plate structure members engaged thereby as a rigid unit.

16. An extractor for withdrawing plate structure from a battery case, comprising holding means engaging the case, two means engaging the plate structure at spaced points, two tension members, one connected to each of said engaging means, and means rigidly interconnecting the upper parts of said two tension members to move them precisely simultaneously and equidistantly to pull the plate structure evenly from the battery case.

WILLIAM G. SCHUIRMANN.